United States Patent
Tsao

(10) Patent No.: US 9,239,987 B1
(45) Date of Patent: Jan. 19, 2016

(54) TRIGGER REPEAT ORDER NOTIFICATIONS

(71) Applicant: Accenture Global Services Limited, Dublin (IE)

(72) Inventor: Vivien Tsao, Palo Alto, CA (US)

(73) Assignee: Accenture Global Services Limited, Dublin (IE)

(*) Notice: Subject to any disclaimer, the term of this patent is extended or adjusted under 35 U.S.C. 154(b) by 0 days.

(21) Appl. No.: 14/727,659

(22) Filed: Jun. 1, 2015

(51) Int. Cl.
*G06N 3/08* (2006.01)
*G06F 17/30* (2006.01)

(52) U.S. Cl.
CPC .............. *G06N 3/08* (2013.01); *G06F 17/3053* (2013.01)

(58) Field of Classification Search
None
See application file for complete search history.

(56) References Cited

U.S. PATENT DOCUMENTS

| | | | |
|---|---|---|---|
| 5,991,739 A | 11/1999 | Cupps et al. | |
| 6,195,691 B1 | 2/2001 | Brown | |
| 6,401,085 B1 | 6/2002 | Gershman et al. | |
| 6,519,571 B1 | 2/2003 | Guheen et al. | |
| 6,526,449 B1 | 2/2003 | Philyaw et al. | |
| 6,535,880 B1 | 3/2003 | Musgrove et al. | |
| 6,546,374 B1 | 4/2003 | Esposito et al. | |
| 6,587,838 B1 | 7/2003 | Esposito et al. | |
| 6,697,824 B1 | 2/2004 | Bowman-Amuah | |
| 6,801,228 B2 | 10/2004 | Kargman | |
| 6,845,361 B1 | 1/2005 | Dowling | |
| 6,901,397 B1 | 5/2005 | Moldenhauer et al. | |
| 6,903,723 B1 | 6/2005 | Forest | |
| 6,920,431 B2 | 7/2005 | Showghi et al. | |
| 6,922,567 B1 | 7/2005 | Rydbeck | |
| 6,959,283 B1 | 10/2005 | White | |
| 6,961,778 B2 | 11/2005 | Swartz et al. | |
| 6,980,962 B1 | 12/2005 | Arganbright et al. | |
| 7,003,500 B1 | 2/2006 | Driessen | |
| 7,069,235 B1 | 6/2006 | Postelnik et al. | |
| 7,072,856 B1 | 7/2006 | Nachom | |
| 7,110,964 B2 | 9/2006 | Tengler et al. | |
| 7,124,098 B2 | 10/2006 | Hopson et al. | |

(Continued)

FOREIGN PATENT DOCUMENTS

| | | |
|---|---|---|
| EP | 2378480 | 3/2015 |
| WO | WO 00/73955 | 12/2000 |

(Continued)

OTHER PUBLICATIONS

Xie et al, Trying to prosume: toward a theory of consumers as co-creators of value, 2007.*

(Continued)

*Primary Examiner* — Stanley K. Hill
*Assistant Examiner* — Mikayla Chubb
(74) *Attorney, Agent, or Firm* — Fish & Richardson P.C.

(57) ABSTRACT

Methods, systems, and apparatus for receiving a particular set of user data; obtaining a predictive model that estimates a likelihood of a user to order a food item, wherein the predictive model is generated using observation data that includes historic user data and user data from other user devices; providing the particular set of user data to the predictive model; obtaining an indication of a likelihood of the user to order a food item; based on the indication of a likelihood of the user to order a food item, determining whether to output a notification on the user device inviting the user to order a food item; and in response to determining to output a notification on the user device inviting the user to order a food item, selectively outputting a notification on the user device inviting the user to order a food item.

21 Claims, 5 Drawing Sheets

(56) References Cited

U.S. PATENT DOCUMENTS

| | | |
|---|---|---|
| 7,124,101 B1 | 10/2006 | Mikurak |
| 7,197,478 B2 | 3/2007 | Kargman |
| 7,200,614 B2 | 4/2007 | Reid et al. |
| 7,206,756 B1 | 4/2007 | Walsky |
| 7,233,655 B2 | 6/2007 | Gailey et al. |
| 7,270,267 B2 | 9/2007 | Yeung et al. |
| 7,287,002 B1 | 10/2007 | Asher et al. |
| 7,302,429 B1 | 11/2007 | Wanker et al. |
| 7,340,414 B2 | 3/2008 | Roh et al. |
| 7,412,260 B2 | 8/2008 | Gailey et al. |
| 7,437,295 B2 | 10/2008 | Pitts, III et al. |
| 7,496,526 B2 | 2/2009 | Razumov |
| 7,532,947 B2 | 5/2009 | Waddington et al. |
| 7,590,538 B2 | 9/2009 | St. John |
| 7,603,287 B2 | 10/2009 | Kargman |
| 7,613,636 B2 | 11/2009 | Kargman |
| 7,652,558 B2 | 1/2010 | Lovegreen et al. |
| 7,664,736 B2 | 2/2010 | Jung et al. |
| 7,694,881 B2 | 4/2010 | Jung et al. |
| 7,698,228 B2 | 4/2010 | Gailey et al. |
| 7,699,219 B2 | 4/2010 | Drummond et al. |
| 7,730,160 B2 | 6/2010 | Moricz |
| 7,774,236 B2 | 8/2010 | Steres et al. |
| 7,776,372 B2 | 8/2010 | Hrudka |
| 7,778,884 B2 | 8/2010 | Bamborough et al. |
| 7,835,946 B2 | 11/2010 | Goren et al. |
| 7,840,591 B2 | 11/2010 | Lutnick |
| 7,860,757 B2 | 12/2010 | Cotton et al. |
| 7,882,150 B2 | 2/2011 | Badyal |
| 7,886,964 B2 | 2/2011 | Steinecker |
| 7,940,914 B2 | 5/2011 | Petrushin |
| 7,945,479 B2 | 5/2011 | Asher et al. |
| 7,970,118 B2 | 6/2011 | O'Dell, III |
| 7,974,873 B2 | 7/2011 | Simmons et al. |
| 8,031,858 B2 | 10/2011 | Miller et al. |
| 8,032,427 B1 | 10/2011 | Spreen et al. |
| 8,065,291 B2 | 11/2011 | Knorr |
| 8,068,599 B2 | 11/2011 | Sarin et al. |
| 8,069,070 B2 | 11/2011 | Papili et al. |
| 8,086,495 B2 | 12/2011 | Ansari et al. |
| 8,123,130 B2 | 2/2012 | Pentel |
| 8,126,777 B2 | 2/2012 | Postelnik et al. |
| 8,150,737 B2 | 4/2012 | Lutnick et al. |
| 8,150,738 B2 | 4/2012 | Lutnick |
| 8,190,483 B2 | 5/2012 | Woycik et al. |
| 8,200,550 B2 | 6/2012 | Aitkins |
| 8,204,757 B2 | 6/2012 | Carlson et al. |
| 8,212,833 B2 | 7/2012 | Kargman |
| 8,271,336 B2 | 9/2012 | Mikurak |
| 8,311,901 B1 | 11/2012 | Carmichael et al. |
| 8,346,624 B2 | 1/2013 | Goad et al. |
| 8,363,814 B2 | 1/2013 | Shaffer et al. |
| 8,417,258 B2 | 4/2013 | Barnes, Jr. |
| 8,433,617 B2 | 4/2013 | Goad et al. |
| 8,436,826 B2 | 5/2013 | Lam |
| 8,438,089 B1 | 5/2013 | Wasserblat et al. |
| 8,452,667 B1 | 5/2013 | Shimoff et al. |
| 8,521,745 B2 | 8/2013 | Probst et al. |
| 8,565,735 B2 | 10/2013 | Wohlwend et al. |
| 8,577,739 B2 | 11/2013 | Ansari et al. |
| 8,600,821 B2 | 12/2013 | Borders et al. |
| 8,626,590 B2 | 1/2014 | Istfan |
| 8,645,274 B2 | 2/2014 | Hasson |
| 8,650,095 B1 | 2/2014 | Shimoff et al. |
| 8,655,743 B1 | 2/2014 | Shimoff et al. |
| 8,660,903 B1 | 2/2014 | Croak et al. |
| 8,676,663 B1* | 3/2014 | Robinson et al. ............ 705/26.1 |
| 8,732,101 B1* | 5/2014 | Wilson et al. .................. 706/15 |
| 8,738,449 B1 | 5/2014 | Cupps et al. |
| 8,743,073 B2 | 6/2014 | Lam |
| 8,744,913 B2 | 6/2014 | Nasrallah |
| 8,805,729 B2 | 8/2014 | Afram et al. |
| 8,880,420 B2 | 11/2014 | Scotto |
| 8,930,245 B2 | 1/2015 | Streich |
| 8,971,503 B1 | 3/2015 | Kargman |
| 2002/0038261 A1 | 3/2002 | Kargman et al. |
| 2002/0049644 A1 | 4/2002 | Kargman |
| 2002/0067827 A1 | 6/2002 | Kargman |
| 2002/0188492 A1 | 12/2002 | Borton |
| 2004/0111321 A1 | 6/2004 | Kargman |
| 2004/0158494 A1 | 8/2004 | Suthar |
| 2004/0267616 A1 | 12/2004 | Kargman |
| 2005/0015256 A1 | 1/2005 | Kargman |
| 2005/0021407 A1 | 1/2005 | Kargman |
| 2005/0045728 A1 | 3/2005 | Kargman |
| 2005/0049922 A1 | 3/2005 | Kargman |
| 2005/0108097 A1 | 5/2005 | McAleenan |
| 2005/0209914 A1 | 9/2005 | Nguyen et al. |
| 2005/0220009 A1 | 10/2005 | Kargman |
| 2005/0267811 A1 | 12/2005 | Almblad |
| 2006/0010037 A1 | 1/2006 | Angert et al. |
| 2006/0041482 A1 | 2/2006 | Awiszus et al. |
| 2006/0080163 A1 | 4/2006 | Sutcliffe |
| 2006/0080165 A1 | 4/2006 | Sutcliffe |
| 2006/0122896 A1 | 6/2006 | Parsley |
| 2006/0123098 A1 | 6/2006 | Asher et al. |
| 2006/0155753 A1 | 7/2006 | Asher et al. |
| 2006/0155770 A1 | 7/2006 | Asher et al. |
| 2006/0173754 A1 | 8/2006 | Burton et al. |
| 2006/0178943 A1 | 8/2006 | Rollinson et al. |
| 2006/0178951 A1 | 8/2006 | Rund, III |
| 2006/0206390 A1 | 9/2006 | Asano |
| 2006/0218039 A1 | 9/2006 | Johnson |
| 2006/0293965 A1 | 12/2006 | Burton |
| 2007/0061225 A1 | 3/2007 | Havas |
| 2007/0073586 A1 | 3/2007 | Dev et al. |
| 2007/0088624 A1 | 4/2007 | Vaughn et al. |
| 2007/0106565 A1 | 5/2007 | Coelho |
| 2007/0150321 A1 | 6/2007 | Zhao et al. |
| 2007/0150349 A1* | 6/2007 | Handel et al. ................... 705/14 |
| 2007/0150375 A1 | 6/2007 | Yang |
| 2007/0162849 A1 | 7/2007 | Marciano |
| 2007/0208626 A1 | 9/2007 | Awiszus |
| 2007/0276651 A1 | 11/2007 | Bliss et al. |
| 2008/0082420 A1 | 4/2008 | Kargman et al. |
| 2008/0097861 A1 | 4/2008 | Awiszus et al. |
| 2008/0208697 A1 | 8/2008 | Kargman et al. |
| 2008/0229430 A1 | 9/2008 | Kargman |
| 2008/0262972 A1 | 10/2008 | Blake |
| 2009/0048890 A1 | 2/2009 | Burgh |
| 2009/0077000 A1* | 3/2009 | Begole et al. ................... 706/54 |
| 2009/0099972 A1 | 4/2009 | Angert et al. |
| 2009/0106124 A1 | 4/2009 | Yang |
| 2009/0119180 A1 | 5/2009 | Moravsky et al. |
| 2009/0150193 A1 | 6/2009 | Hong et al. |
| 2009/0167553 A1 | 7/2009 | Hong et al. |
| 2009/0204492 A1 | 8/2009 | Scifo et al. |
| 2009/0240598 A1 | 9/2009 | Kargman |
| 2009/0261162 A1 | 10/2009 | Kargman et al. |
| 2009/0265216 A1* | 10/2009 | Flynn et al. .................... 705/10 |
| 2009/0276347 A1 | 11/2009 | Kargman |
| 2009/0307079 A1 | 12/2009 | Martin, Jr. |
| 2009/0307096 A1 | 12/2009 | Antonellis |
| 2010/0023410 A1 | 1/2010 | Doan |
| 2010/0046510 A1 | 2/2010 | Koster et al. |
| 2010/0094715 A1 | 4/2010 | Kim et al. |
| 2010/0106607 A1 | 4/2010 | Riddiford et al. |
| 2010/0241707 A1 | 9/2010 | Burton et al. |
| 2010/0274633 A1 | 10/2010 | Scrivano et al. |
| 2011/0011936 A1 | 1/2011 | Morandi et al. |
| 2011/0040654 A1 | 2/2011 | Lutnick et al. |
| 2011/0078637 A1 | 3/2011 | Inderrieden et al. |
| 2011/0082773 A1 | 4/2011 | Potter |
| 2011/0153457 A1 | 6/2011 | Hinks |
| 2011/0173041 A1 | 7/2011 | Breitenbach et al. |
| 2011/0218839 A1 | 9/2011 | Shamaiengar |
| 2011/0258058 A1 | 10/2011 | Carroll et al. |
| 2012/0016745 A1 | 1/2012 | Hendrickson |
| 2012/0022883 A1 | 1/2012 | Morrison |
| 2012/0036017 A1 | 2/2012 | Hasson |
| 2012/0036028 A1 | 2/2012 | Webb |
| 2012/0215657 A1 | 8/2012 | Compton et al. |
| 2012/0296679 A1 | 11/2012 | Im |
| 2013/0007615 A1 | 1/2013 | Goldman |

(56) References Cited

U.S. PATENT DOCUMENTS

| | | |
|---|---|---|
| 2013/0073477 A1 | 3/2013 | Grinberg |
| 2013/0080269 A1 | 3/2013 | Awiszus |
| 2013/0097054 A1 | 4/2013 | Breitenbach et al. |
| 2013/0124355 A1 | 5/2013 | Wazihullah |
| 2013/0124449 A1* | 5/2013 | Pinckney et al. ........... 706/52 |
| 2013/0130208 A1 | 5/2013 | Riscalla |
| 2013/0144696 A1 | 6/2013 | Raisch |
| 2013/0144730 A1 | 6/2013 | Harman |
| 2013/0151357 A1 | 6/2013 | Havas et al. |
| 2013/0191243 A1 | 7/2013 | Jung et al. |
| 2013/0204718 A1 | 8/2013 | Freeman |
| 2013/0218692 A1 | 8/2013 | Fischer |
| 2013/0226651 A1 | 8/2013 | Napper |
| 2013/0238451 A1 | 9/2013 | Riscalla |
| 2013/0317921 A1 | 11/2013 | Havas |
| 2013/0325641 A1 | 12/2013 | Brown et al. |
| 2013/0339163 A1 | 12/2013 | Dumontet et al. |
| 2014/0032341 A1 | 1/2014 | Balasubramanian et al. |
| 2014/0046789 A1 | 2/2014 | Baliga |
| 2014/0058901 A1 | 2/2014 | Kim et al. |
| 2014/0114776 A1 | 4/2014 | Solanki et al. |
| 2014/0121811 A1 | 5/2014 | Jung et al. |
| 2014/0156399 A1 | 6/2014 | Jones et al. |
| 2014/0188637 A1 | 7/2014 | Balasubramaniam et al. |
| 2014/0214465 A1 | 7/2014 | L'Heureux et al. |
| 2014/0229301 A1 | 8/2014 | Wu |
| 2014/0249937 A1 | 9/2014 | McNally |
| 2014/0316914 A1 | 10/2014 | Ramini |
| 2014/0330671 A1 | 11/2014 | Mierle et al. |
| 2014/0330672 A1 | 11/2014 | Mierle et al. |
| 2014/0330681 A1 | 11/2014 | Mierle |
| 2014/0343976 A1 | 11/2014 | Ahluwalia et al. |
| 2014/0358778 A1 | 12/2014 | Banerjee et al. |
| 2014/0364164 A1 | 12/2014 | Griffin |
| 2015/0039450 A1 | 2/2015 | Hernblad |
| 2015/0046271 A1 | 2/2015 | Scholl et al. |
| 2015/0088676 A1 | 3/2015 | Elliott et al. |

FOREIGN PATENT DOCUMENTS

| | | |
|---|---|---|
| WO | WO 01/11523 | 2/2001 |
| WO | WO 01/73750 | 10/2001 |
| WO | WO 2014/151806 | 9/2014 |

OTHER PUBLICATIONS

'IBM Guidelines' [online] "Guidelines for estimating CPLEX memory requirements based on problem size," Apr. 9, 2012 [retrieved on Jun. 8, 2015]. Retrieved from the Internet: URL: http://www-01.ibm.com/support/docview.wss?uid=swg21399933, 3 pages.

Clarke and Wright, "Scheduling vehicles from a central depot to a number of delivery points," Operations Res., 12:568-581 (1964).

Cook, Chpt 1 "Challenges," In Pursuit of the Travelling Salesman: Mathematics at the Limits of Computation, Princeton University Press, 2011, 20 pages.

Edwards et al., "A Methodology and Implementation for Analytic Modeling in Electronic Commerce Applications," Electronic Commerce Technologies, Lecture notes in computer science, 2040:148-157, 2001.

Fingas, "Square's new restaurant delivery app lets you track your meal," engadget, (Dec. 4, 2014), 6 pages http://www.engadget.com/2014/12/04/caviar-for-iphone/.

Fitchard, "Where's that delivery guy? GrubHub intros meal tracking," (Nov. 13, 2012), 4 pages https://gigaom.com/2012/11/13/wheres-that-delivery-guy-grubhub-intros-meal-tracking/.

Medji, Chpt 5 "Network of Queues," Stochastic Models in Queuing Theory, Elsevier Academic Press, 2002, 35 pages.

Mingozzi et al., "Dynamic programming strategies and reduction techniques for the traveling salesman problem with time windows and precedence constraints," Operations Research, 45:365-377 (1997).

Munkres, "Algorithms for the Assignment and Transportation Problems," J Soc Indust Appl Math., 5(1):32-38 (Mar. 1957).

Rodriguez, "Amazon says it sold 426 items a second on Cyber Monday," LA Times, (Dec. 26, 2013), 2 pages http://articles.latimes.com/2013/dec/26/business/la-fi-tn-amazon-sold-426-items-per-second-cyber-monday-20131226.

* cited by examiner

TRIGGER REPEAT ORDER NOTIFICATIONS

TECHNICAL FIELD

This document generally describes technology related to computer-generated recommendations for electronic orders, such as orders for food items placed through mobile applications.

BACKGROUND

Mobile computing devices (e.g., smartphones, tablet computing devices, wearable computing devices) have been programmed to assist users with placing orders for goods and services. For example, users can download and install mobile applications ("mobile apps") for retailers, and can use the mobile apps to browse goods, select goods (e.g., place goods in an electronic shopping cart), purchase the selected goods (e.g., electronically checkout), designate a way for the user to get the goods (e.g., delivery, in-store pickup), and can track the progress of their orders (e.g., view order status).

Some mobile apps can include location-based services to provide users with information that is likely to be relevant the users' current locations. For example, a mobile app for a retailer with multiple physical stores can include location based services that allow a user to identify the closest store nearby for the retailer. For instance, a user of such a mobile app may select a feature to view the closest store nearby, and the mobile app can access the current location of the mobile computing device that is running the mobile app, provide it to a location service for the retailer, and receive in response a listing of the stores for the retailer that are closest to the mobile computing device's current location.

SUMMARY

Innovative aspects of the subject matter described in this specification may be embodied in methods that include the actions of receiving a particular set of user data, the particular set of user data including user data obtained from a user device; obtaining a predictive model that estimates a likelihood of a user to order a food item, wherein the predictive model is generated using observation data that includes historic user data and user data from other user devices; providing the particular set of user data to the predictive model; obtaining, from the predictive model, an indication of a likelihood of the user to order a food item; based on the indication of a likelihood of the user to order a food item obtained from the predictive model, determining whether to output a notification on the user device inviting the user to order a food item; and in response to determining whether to output a notification on the user device inviting the user to order a food item, selectively outputting a notification on the user device inviting the user to order a food item.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the method includes the actions of receiving an acceptance of the invitation to order a food item; and processing the order for the food item.

In some implementations the predictive model comprises a first sub-predictive model and a second sub-predictive model, wherein the first sub-predictive model is configured to receive a data input and generate a respective output, and the generated respective output is provided as input to the second sub-predictive model.

In certain aspects the first sub-predictive model is generated using observation data that includes a user's purchase history, browser history, search query history, calendar history and location history.

In some implementations the first sub-predictive model estimates an inclination of the user to cook.

In other implementations the first sub-predictive model estimates an inclination of the user to dine out.

In some aspects the first sub-predictive model estimates a likelihood of that the user has already ordered food within a recent time interval.

In other aspects the first sub-predictive model estimates a likelihood of that the user has already ordered a food item.

In certain implementations the first sub-predictive model estimates a likelihood that the user has performed an activity that is associated with ordering food.

In other implementations the first sub-predictive model estimates a likelihood that the user has performed an activity that is associated with not ordering food.

In some aspects the second sub-predictive model comprises a final predictive model component and the second sub-predictive model receives one or more outputs from the first sub-predictive model.

In certain aspects the second sub-predictive model estimates a likelihood of a user to order a food item, wherein the predictive model is generated using observation data that includes historic user data.

In some implementations the particular set of user data includes location information, time and date information, calendar entries information, weather information and mode of transport information.

In some implementations the predictive model comprises a decision tree.

In some aspects the indication of how likely a user of the user device wants to order a food item includes a confidence score.

In other aspects, determining whether to output a notification on the user device inviting the user to order a food item comprises generating a confidence score threshold and determining whether the confidence score exceeds or meets the confidence score threshold.

In some implementations selectively outputting a notification on the user device inviting the user to order a food item comprises generating one or more food item recommendations; selecting a food item recommendation from the one or more food item recommendations; generating a notification inviting the user to order the food item; and providing the generated notification inviting the user to order the food item for display on the user device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system for providing repeat order notifications on a user device inviting a user to order a food item. The system employs a predictive model that estimates a likelihood of a user to order a food item, and based upon the estimated likelihood, outputs a corresponding notification on the user device inviting the user to order a food item. The predictive model is trained to estimate a likelihood of a user to order a food item using historical user data. For example, the historical user data may include frequented travel path information, food consumption pattern information, recent food order information and food type consumption patterns. The predictive model also uses other data obtained from the user device to estimate the likelihood of a user to order a food item, such as location information, time and date information, calendar entries information, weather information and mode of transport information.

Figure 1:
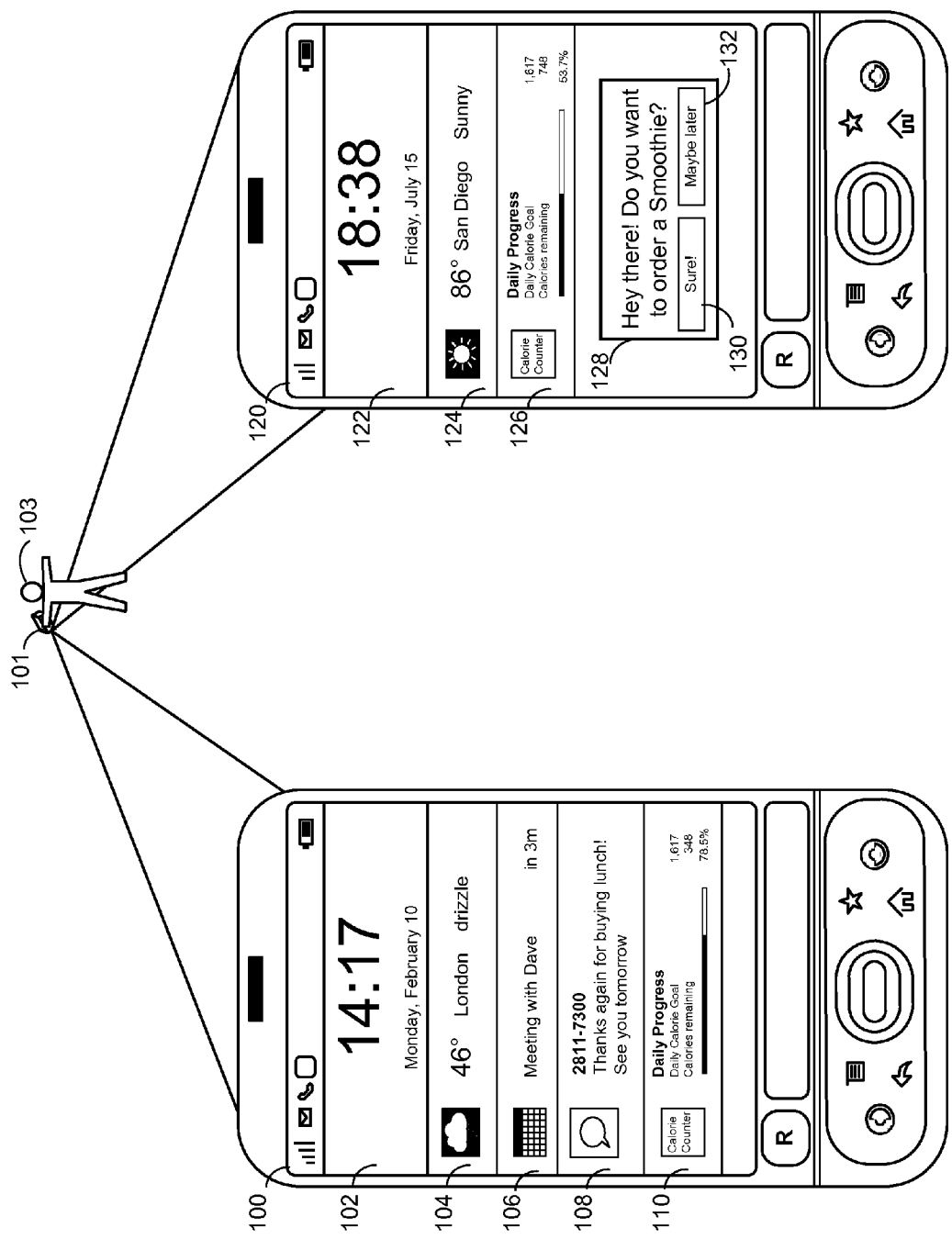
FIG. 1 depicts example mobile device user interfaces.

FIG. 1 depicts two example mobile device user interfaces 100 and 120 presented at different occasions to a user 103 on a mobile device 101.

The user interface 100 depicted in FIG. 1 is a representative mobile device user interface. In this example, a time and date indicator 102 shows that it is currently 14:17 on Monday, February 10. In addition, the user interface shows a weather indicator 104 which presents the weather conditions at the user's current location. The weather indicator 104 shows that the user is currently in London, England, that the current temperature is 46 degrees Fahrenheit and that the weather condition is drizzly. The location of the user may be determined using GPS or other similar mechanisms, for example IP address or cell tower triangulation. In some implementations, the mobile device may have access to a locations database which stores information identifying places of interest to the user, and geographic coordinates associated with the identified places of interest. Such places of interest can include a home address or regularly frequented locations such as a place of work, a gym, addresses or restaurants.

A calendar alert box 106 indicates to the user any upcoming prior arrangements, such as appointments, reminders or meetings. The calendar alert box may communicate with a task and calendar database to access calendar information, such as appointment information, task lists, and other similar information for a user of the mobile device. The calendar information may, for example, include information about start and end times of appointments in addition to the descriptions of the appointments, and contact information for other people expected to be at the appointments. The task lists may include descriptions of tasks or chores that the user needs to complete in the future. Data in the tasks and calendar database may be accessed to determine identifying information for users associated with appointments or tasks, beginning and ending times for various appointments or active periods for tasks, and other information about the appointments or tasks. In this example, the user interface 100 shows the user that he or she has organized a meeting with "Dave" to commence in 3 minutes time. In some implementations, the user device may also indicate that a prior arrangement is overdue, for example if the user is running 5 minutes late and has not deleted the calendar alert, the calendar alert box may show that the meeting was due to commence 5 minutes ago.

A text or short message service (SMS) alert box 108 indicates to the user any unread text messages received by the user. The text or SMS alert box 108 includes the name or phone number of the sender of the text message, and an excerpt of the message received. The text or SMS alert box 108 is one example of many alert boxes that may be presented to the user. For example, in some implementations the user interface 100 may present an email alert box upon receiving an unread email, a voice mail alert box upon receiving an unopened voice mail message, or an alert from a social media application upon receiving unread communication of some kind. In some implementations, the phone number of the sender of the text message is shown within the text or SMS alert box 108, e.g. the phone number 2811-7300. In other implementations, the name of the sender of the text message is shown. The text or SMS alert box 108 may communicate with a contacts database in order to provide the name of the sender of the text message. The contacts database may include names of the user's contacts, telephone numbers for the contacts, and address information for the contacts. In some implementations the excerpt of the received message may include the first 10 words of the received text message, or if the message is shorter than the predetermined limit, the whole text message, e.g., the text message "Thanks for buying lunch! See you tomorrow."

The user interface also presents alert boxes from software applications installed and executing on the mobile device. For example, the application alert box 110 indicates a message for the user or a current status of the user from a software application executing on the mobile device. In this example, the user is executing the application "Calorie Counter" on the mobile device, and has received an alert from the software application. The alert indicates the user's daily progress, the user's daily calorie goal of 1,617 calories, the user's remaining 348 calories for that day and a percentage of the user's current calorie intake. In other implementations, the user interface may present multiple alert boxes from multiple software applications installed and executing on the mobile device. The alerts may display icons, video, graphics, images and text that include various indicators relating to the software application.

The user interface 120 depicted in FIG. 1 is another representative mobile device user interface. In this example, a time and date indicator 122 shows that it is currently 18:38 on Friday, July 15. In addition, the user interface shows a weather indicator 124 which presents the weather conditions at the user's current location. The weather indicator 124 shows that the user is currently in San Diego, USA, that the current temperature is 86 degrees Fahrenheit and that the weather condition is sunny. In some implementations the mobile device may access a location database storing information identifying places of interest to the user, and determine whether or not the user is currently located in or near a place of interest. For example, the mobile device may determine that the current location of San Diego is the user's hometown.

Unlike the user interface 100, the user interface 120 does not include a calendar alert box, indicating that the user does not have any upcoming or overdue prior arrangements, such as appointments, reminders, meetings or tasks. Similarly, the user interface 120 also does not include a text or short message service (SMS) alert box indicating that the user has not received any unread text messages.

The user interface 120 includes an alert box 126 presenting an alert from the executing software application "Calorie Counter." The alert indicates the user's daily progress, the user's daily calorie goal of 1,617 calories, the user's remaining 748 calories for that day and a percentage of the user's current calorie intake.

The user interface 120 includes an order notification 128 for a food item. The order notification 128 is presented to the user on the user interface 120 based upon determining that the user is likely interested in ordering a food item. In this example, the mobile device may have received and processed a set of user data in order to determine that the user is likely interested in ordering a smoothie. For example, the mobile device may have recognized that the user is likely to order food, in particular a smoothie, on a Friday evening, as opposed to ordering food on a Monday afternoon, as depicted in user interface 100. Furthermore, the mobile device may also recognize that a user is more likely to order a smoothie in the summertime when the weather is fine, as opposed to winter when the weather is cold and wet, as depicted in user interface 100. In addition, the mobile device may use location data to recognize that the user is likely to order a smoothie from a specific restaurant/provider, for example from a restaurant in their hometown, or from a chain of restaurants in several towns.

In some implementations the mobile device may access calendar information and text message information in order to determine whether the user is likely to order a food item, for example the mobile device may recognize that the user is unlikely to want to order a food item immediately before an appointment, e.g., before a meeting with Dave in 3 minutes, or shortly after eating lunch. In addition, the mobile device may use information from executing software applications to determine whether a user is likely to order food. For example, as depicted in user interface 120, the mobile device may recognize that a user is more likely to want to order a smoothie if they are currently well within their allowed calorie intake for that day. Determining whether a user is likely interested in ordering a food item will be described in more detail below with reference to FIG. 3.

The order notification 128 invites the user to place an order for a food item, for example by presenting the message "Hey there! Do you want to order a smoothie?" The order notification 128 includes two selectable links 130 and 132 responsive to the invitation. In some implementations, upon selecting the link 132 "Maybe later," the order notification may remain on the user interface, may occupy a smaller space on the user interface, e.g., as a smaller icon, or may disappear entirely. In some implementations, upon selecting the link 130 "Sure!" the user may be presented with an alternative user interface displaying information relating to ordering a smoothie. Processing an order notification is described in more detail below with reference to FIG. 4.

Figure 2:
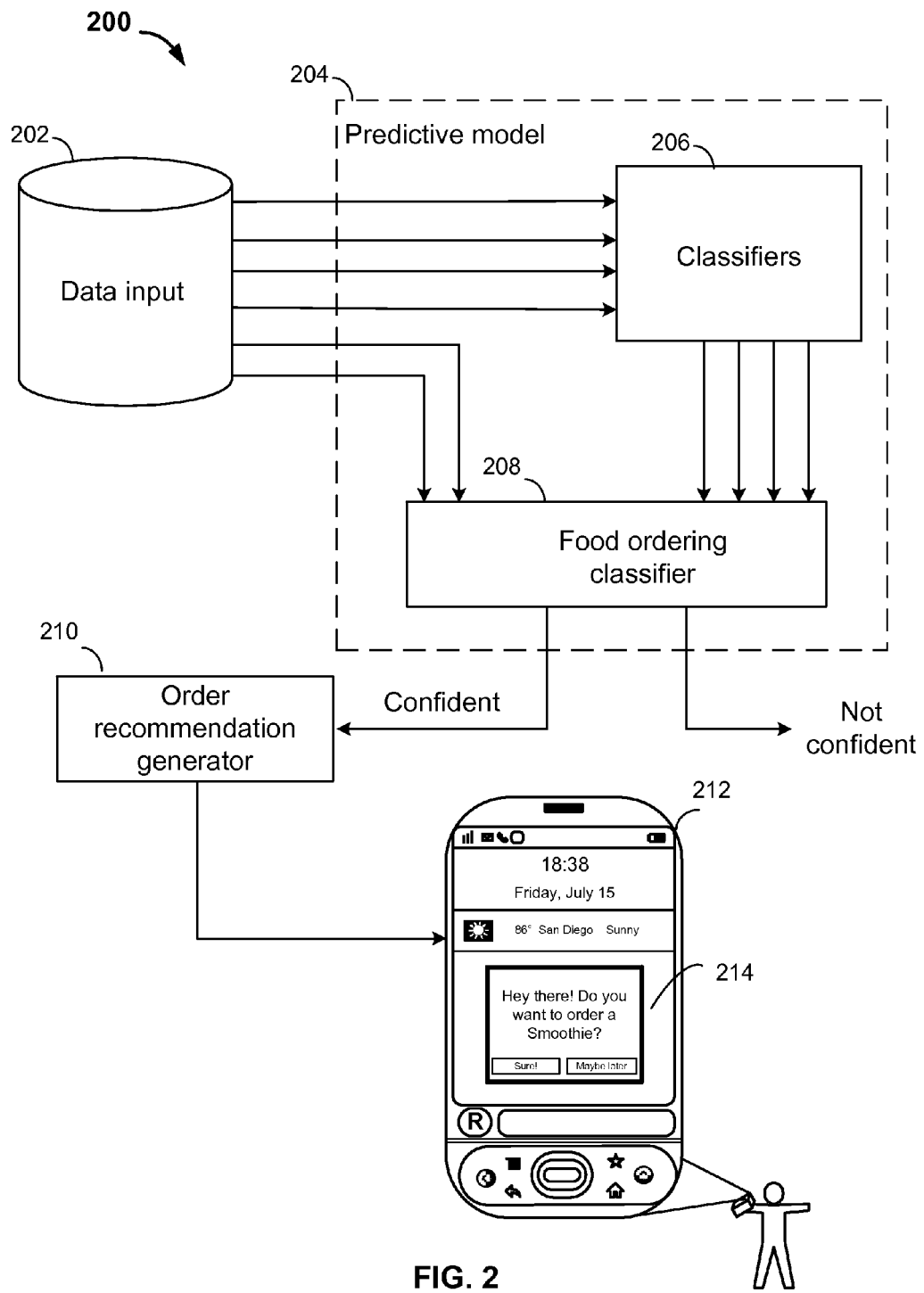
FIG. 2 depicts a block diagram of an example system for providing repeat order notifications.

FIG. 2 depicts a block diagram of an example system 200 for providing repeat order notifications. The system 200 can be capable of receiving data that includes user data from a user device. The received data can be provided to a predictive model, and a likelihood of a user to order a food item may be determined. Based on the determined likelihood, the system 200 can determine to output a notification on the user device inviting the user to order a food item. The system may generate an order recommendation and selectively output a corresponding notification on the user device inviting the user to order the recommended food item.

Generally, the system 200 may include a predictive model 204, which includes a first sub-predictive model 206 that receives user data 202 and classifies the user data and a second sub-predictive model 208 that receives user data and an output from the first sub-predictive model and estimates a likelihood of a user to order a food item, and an order recommendation generator 210 that generates order recommendations to be presented to a user on a user device 212 in a repeat order notification 214.

The predictive model 204 receives as an input a set of user data 202. The user data includes raw observational data obtained from a user device. The raw data may include information regarding the current time and date, current weather conditions, current location, current mode of transport, recent appointments or activities, upcoming appointments or activities and recent communication.

The first sub-predictive model 206 may receive some or all of the user data input 202. The first sub-predictive model 206 includes one or more classifiers that use the user data input to generate outputs that may be used to estimate a likelihood of a user to order a food item. For example, the first sub-predictive model 206 may include a set of classifiers that receive a set of raw observational data and generate a set of outputs that estimate an inclination of a user to cook, an inclination of a user to dine out, a likelihood of that the user has already ordered food within a recent time interval, a likelihood of that the user has already ordered a food item, a likelihood of that the user has performed an activity that is associated with ordering food, or a likelihood of that the user has performed an activity that is associated with not ordering food. In some implementations, the first sub-predictive model is a decision tree. In other implementations, the first sub-predictive model includes one or more neural network layers and classifiers. The first sub-predictive model may be generated or trained using observation data that includes a user's purchase history, browser history, search query history, calendar history and location history.

The second sub-predictive model 208 may receive some of the user data input 202 and any outputs generated by the first sub-predictive model 206. The second sub-predictive model 208 is a final predictive model component of the predictive model 204. The second sub-predictive model 208 includes a food ordering classifier that uses the user data input 202 and any outputs generated by the first sub-predictive model 206 to estimate a likelihood of a user to order a food item. In some implementations the second sub-predictive model 210 is a decision tree. In other implementations the second sub-predictive model is a final layer of a neural network. The second sub-predictive model may be generated or trained using observation data that includes a user's purchase history, browser history, search query history, calendar history and location history.

The second sub-predictive model outputs an estimated likelihood of a user to order a food item. In some implementations the estimated likelihood is a confidence score reflecting the predictive model's confidence that the user is likely to order a food item. The estimated likelihood is determined using the received user data input 202 and any outputs generated by the first sub-predictive model 206. In some implementations, the outputs generated by the first sub-predictive model 206 may increase the likelihood of a user to order a food item. For example, if the second sub-predictive model receives a user data input indicating that the weather is warm and the user is driving towards a smoothie provider, as well as an indication from the first sub-predictive model that the user often purchases smoothies, the estimated likelihood of a user to order a smoothie may be high. In other implementations, the outputs generated by the first sub-predictive model 206 may decrease the likelihood of a user to order a food item. For example, if the second sub-predictive model receives a user data input indicating that the user is traveling home from work on a Friday evening at 7:30 pm on a route past a pizza restaurant, as well as an indication from the first sub-predictive model that the user enjoys to cook, the estimated likelihood of a user to order a pizza may be low.

The order recommendation generator 210 may receive an indication that a user is likely to order a food item. The order recommendation generator 210 produces order recommendations to be presented to a user on a user device 212 in a repeat order notification 214. The order recommendation generator may generate food order recommendations using observation data that includes a user's purchase history, browser history, search query history, calendar history and location history. For example, the order recommendation generator may generate a recommendation to order a pepperoni pizza from a particular Italian restaurant based on observing a pattern in the observation data indicating that the user regularly orders a pepperoni pizza from a particular Italian restaurant. In other examples, the order recommendation generator may generate a recommendation to order a smoothie from one or more food outlets based on observing a pattern in the observation data indicating that the user regularly orders different smoothies from different providers following a workout.

The user device 212 receives the order recommendation from the order recommendation generator 210 and presents a repeat order notification 214 to the user on the user device. The repeat order recommendation may include one or more user selectable links that enable the user to decline or accept the repeat order recommendation. For example, upon accepting the repeat order recommendation, the user device may execute an application accessible through a web browser running on a computing device that enables a customer to place an order. In other examples, the user device may execute a mobile application, SMS application, or voice interface to enable a user to process a repeat order notification and place an order. An example system for processing repeat order notifications is described in more detail below with reference to FIG. 4.

Figure 3:
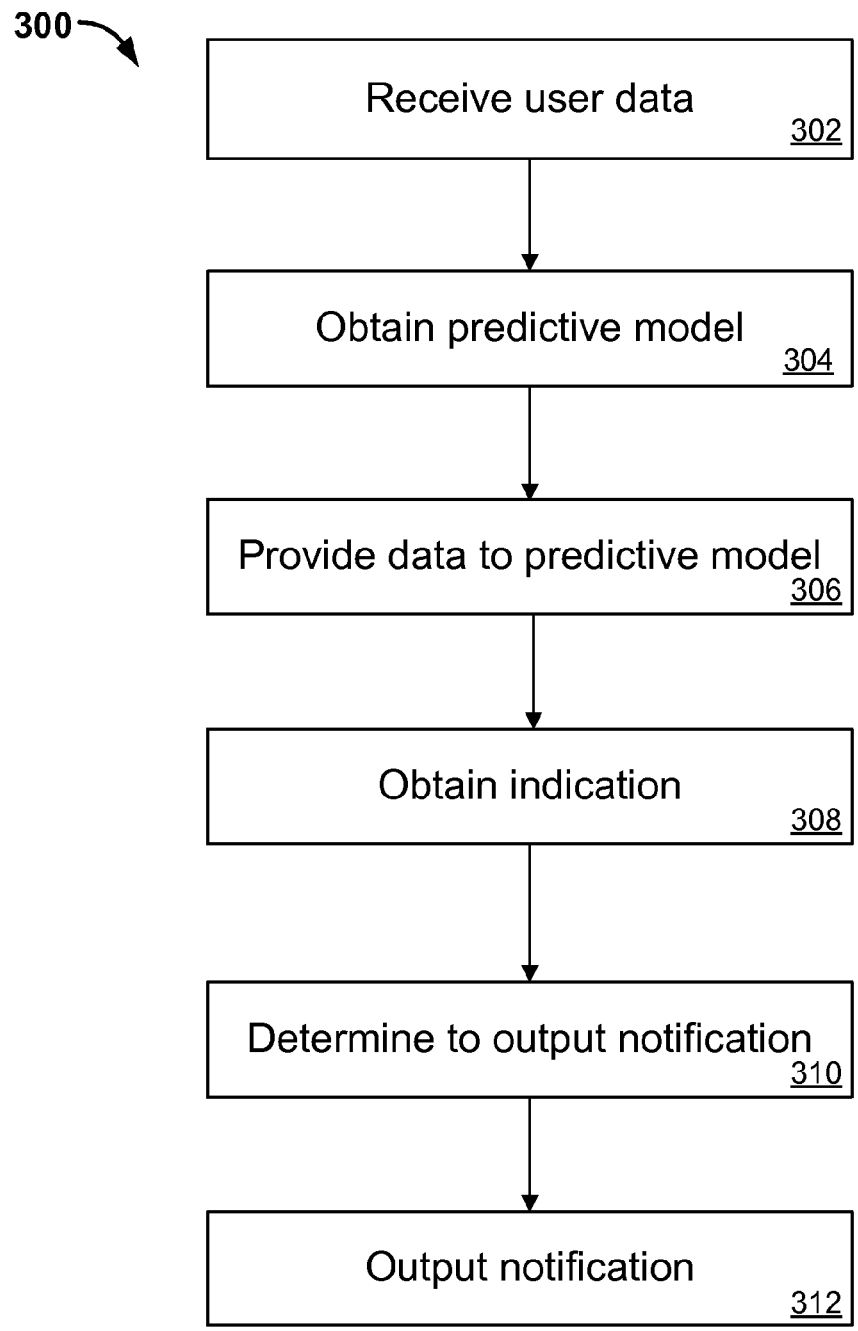
FIG. 3 depicts a flowchart of an example process for providing a repeat order notification.

FIG. 3 is a flowchart of an example process 300 for providing a repeat order notification on a user device. For example, the process 300 can be performed by the system 200 in response to receiving a particular set of user data.

At step 302, the system receives a particular set of user data. The particular set of user data includes user data obtained from a user device. In some implementations, the particular set of user data may include raw data obtained from a user device, such as information regarding the current time and date, current weather conditions, current location, current mode of transport, recent appointments or activities, upcoming appointments or activities and recent communication with friends, colleagues or family.

At step 304, the system obtains a predictive model that estimates a likelihood of a user to order a food item. In some implementations, the predictive model is a decision tree. In other implementations, the predictive model is a deep neural network including several classifiers. The predictive model is generated using observation data that includes historic user data and user data from other user devices. In some implementations, the historic user data may include information regarding a user's purchase history, browser history, search query history, calendar history and location history. The predictive model includes a first sub-predictive model and a second sub-predictive model. The first sub-predictive model is configured to receive a data input and generate a respective output, which is in turn provided as input to the second sub-predictive model.

In some implementations, the first sub-predictive model may estimate an inclination of the user to cook. The first sub-predictive model may be generated using observation data that includes historic user data and user data from other user devices, such as the type of food products a user buys, how regularly the user eats out, patterns or themes in a user's browser history and search query history. For example, if a user regularly shops in a shop selling cooking equipment, the first sub-predictive model may interpret this behavior as an indication that the user enjoys to cook. Similarly for if the user tends to buy raw ingredients or exotic ingredients. However, if the user tends to buy canned food or ready prepared meals, the first sub-predictive model may interpret this behavior as indication that the user does not enjoy cooking. In other examples, if a user's purchase history includes regular purchases at restaurants or cafes, the first sub-predictive model may interpret this behavior as an indication that the user does not enjoy to cook. Or, if a user's browser history shows that a user regularly searches for food recipes, or visits food-related blogs or websites, the first sub-predictive model may interpret this behavior as indicating that the user enjoys cooking.

In other implementations, the first sub-predictive model may estimate an inclination of the user to dine out. The first sub-predictive model may be generated using observation data that includes historic user data and user data from other user devices, such as how regularly the user dines out, or patterns and themes in a user's browser history and search query history. For example, if a user's purchase history includes regular purchases at restaurants or cafes, the first sub-predictive model may interpret this behavior as an indication that the user likes to dine out. Similarly, if the user's browser history and search query history shows that the user regularly searches for local restaurants or cafes, or reads and writes reviews about restaurants or cafes, the first sub-predictive model may interpret this behavior as indicating that the user likes to dine out.

In some implementations, the first sub-predictive model may estimate a likelihood that the user has already eaten within a recent time interval. The first sub-predictive model may be generated using observation data that includes historic user data and user data from other user devices, such as location data, recent appointments or activities, or communication history. For example, if a user's calendar shows that the user had an appointment to meet someone for lunch less than 2 hours ago, the first sub-predictive model may interpret this behavior as indicating that the user has already eaten recently, and would not be interested in ordering a food item in the near future. Similarly, if the user has spoken on the telephone, written an email or text message, or used some other form of communication and discussed a recent meal or food consumption, the first sub-predictive model may interpret this behavior as indicating that the user has already eaten recently. In other examples, the first sub-predictive model may access a user's location history to determine whether a user has recently purchased and/or consumed a food item. For example, if the user was located at a restaurant for a duration of 30 minutes 1 hour prior to the current time, the first predictive model may determine a high likelihood of the user already having eaten. If, however, the user was located at a gym for a duration of 60 minutes 1 hour prior to the current time, the first predictive model may interpret this behavior as an indication that the user has not already eaten. In other examples, if a user's location history or purchase history shows that a user has already eaten pizza twice this week, the first sub-predictive model may interpret this behavior as indicating that the user would not be interested in ordering a pizza in the near future.

In other implementations, the first sub-predictive model may estimate a likelihood that the user has already ordered a food item. The first sub-predictive model may be generated using observation data that includes historic user data and user data from other user devices, such as purchase history or communication history. For example, if a user's purchase history shows that the user has recently purchased a food item from an ordering service, the first sub-predictive model may interpret this behavior as indicating that the user has already ordered a food item. Similarly, if the user has made a call or sent an email or text message to a food ordering service recently, or if the user has discussed ordering an item of food with a friend or family member via a telephone call or a text message, the first sub-predictive model may interpret this behavior as indicating that the user has already ordered a food item.

In some implementations, the first sub-predictive model may estimate a likelihood that the user has performed an activity associated with ordering food. The first sub-predictive model may be generated using observation data that includes historic user data and user data from other user devices, such as location history, calendar history or communication history. For example, if a user's location history or calendar history shows that a user has recently visited a gym or performed some exercise, the first sub-predictive model may interpret this behavior as indicating that the user may be hungry and has performed an activity associated with ordering food.

In some implementations, the first sub-predictive model may estimate a likelihood that the user has performed an activity associated with not ordering food. The first sub-predictive model may be generated using observation data that includes historic user data and user data from other user devices, such as location history, calendar history or communication history. For example, if a user's location history or calendar history shows that a user has recently visited a dentist, the first sub-predictive model may interpret this behavior as indicating that the user may not wish to eat anything and has performed an activity associated with not ordering food. In other examples, if the user's communication history or calendar history shows that he or she has recently organized plans for dinner or lunch in the near future, the first sub-predictive model may interpret this behavior as indicating that the user may not wish to eat anything at the moment and has performed an activity associated with not ordering food.

The second sub-predictive model receives one or more outputs from the first sub-predictive model, and includes a final predictive model component. The second sub-predictive model estimates a likelihood of a user to order a food item, and is generated using observation data that includes historic user data.

At step 306, the system provides the particular set of user data to the predictive model.

At step 308, the system obtains an indication of a likelihood of the user to order a food item from the predictive model. The obtained indication of the user to order a food item includes confidence score indicative of the predictive model's confidence that the user would like to order a food item.

At step 310, the system determines whether to output a notification on the user device inviting the user to order a food item, based on the indication of a likelihood of the user to order a food item obtained from the predictive model. In some implementations determining whether to output a notification on the user device includes generating a confidence score threshold and determining whether the obtained confidence score exceeds or meets the confidence score threshold. If the obtained confidence score exceeds or meets the confidence score, the system determines to output a notification on the user device.

In response to determining to output a notification on the user device inviting the user to order a food item, at step 312 the system selectively outputs a notification on the user device inviting the user to order a food item. In some implementations selectively outputting a notification on the user device inviting the user to order a food item includes generating one or more food item recommendations, selecting a food item recommendation from the one or more food item recommendations, generating a notification inviting the user to order the food item and providing the generated notification inviting the user to order the food item for display on the user device.

In some implementations, the food item recommendation includes a recommendation for a food item from a particular restaurant. For example, the system may determine that the user is most likely to order a pizza from a particular Italian restaurant. In other implementations, the food item recommendation may include a recommendation for a particular dish from one or more restaurants, for example a pepperoni pizza from one or more Italian restaurants. In yet other implementations, the food item recommendation may include both a recommendation for a particular dish at a particular restaurant, for example for a pepperoni pizza from a particular Italian restaurant. In other implementations, the food item recommendation may include a recommendation for a food item to be ordered and collected, or for the food item to be ordered and delivered at an address specified by the user. In some implementations, the food item recommendation may include a selectable link to one or more of a corresponding website, online ordering facility or telephone number.

Figure 4:
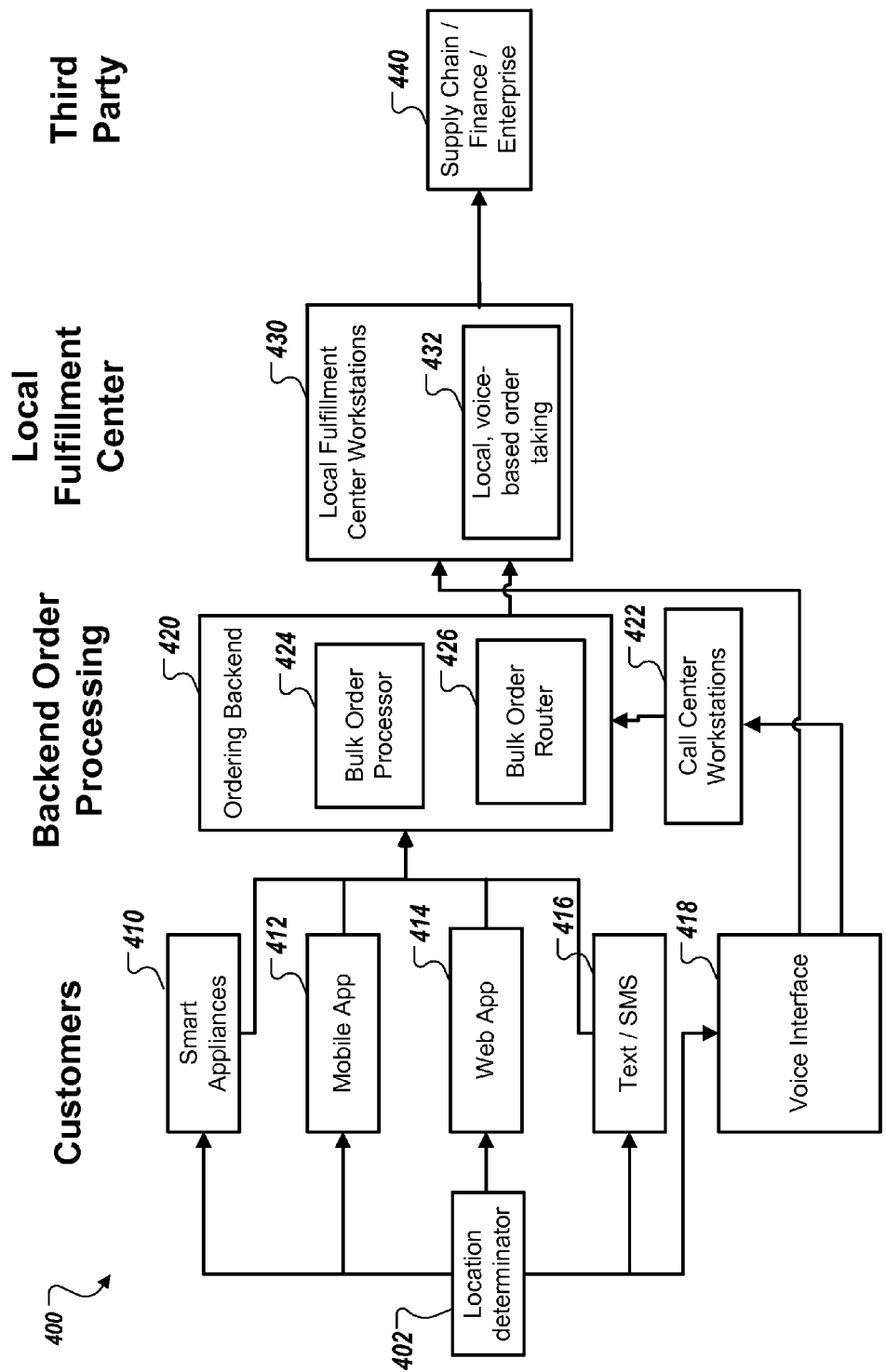
FIG. 4 depicts an example system for processing repeat order notifications.

FIG. 4 depicts an example system 400 for providing repeat order notifications and for processing repeat orders. As described in further detail below, the system 400 may include a location determinator 402, smart appliances 410, a mobile application 412, a web application 414, a text or short message service (SMS) application 416, a voice interface 418, an ordering backend 420, call center workstations 422, local fulfillment center workstations 430, and a supply chain, finance, or enterprise component 440. The system 400 may provide for real time order and delivery of an item. Real time delivery may include point-to-point delivery of small, tangible, purchased goods within a very short period of time of purchase, e.g., few minutes to a few hours. Purchased goods may include typical packaged goods that do not otherwise require real-time delivery, e.g., consumer electronics or office supplies, goods that degrade over a long period of time, e.g., groceries or flowers, or goods that degrade within a very short period of time, e.g., dry ice, ice cream, hot pizza or a cup of coffee.

The location determinator 402 may determine location information for a customer. For example, the location determinator 402 may determine a customer's location based on one or more of a service set identifier (SSID) of a nearby detected wireless network, a detected phone mast signal, determined global positioning system (GPS) information, an assigned Internet Protocol (IP) address, a landline location, or a wireless media access control (MAC) address. The location determinator 402 may provide the location information to the smart appliances 410, the mobile application 412, the web application 414, the text or short message service (SMS) application 416, and the voice interface 418.

The smart appliances 410, the mobile application 412, the web application 414, the text or short message service (SMS) application 416, and the voice interface 418 may enable a customer to place an order. For example, one or more of the smart appliances 410, the mobile application 412, the web application 414, the text or short message service (SMS) application 416, and the voice interface 418 may enable a customer to place an order for a cheese pizza to be delivered to the customer's home address at 7:00 PM. To enable customers to place orders, the smart appliances 410, the mobile application 412, the web application 414, the text or short message service (SMS) application 416, and the voice interface 418 may provide interfaces through which the customer may confirm or specify a particular item to order, and a particular location for which the customer would like to obtain the item. For example, the smart appliances 410, the mobile application 412, the web application 414, the text or short message service (SMS) application 416, and the voice interface 418 may visually or audibly provide notifications or prompts to the customer inviting the customer to order an item or requesting that the customer specify a particular item to order, a particular location to receive the item, and a particular time to receive the item.

More specifically, the smart appliances 410 may be appliances that may be used to place orders. For example, the smart appliances 410 may include a television that may be used by a customer to place an order for a pizza. The smart appliances 410 may provide an interface for a customer to place an order. For example, the smart appliance 410 may include a display that may render an interface for the customer to order a pizza. The smart appliances 410 may provide orders to an ordering backend 420. For example, the smart appliances 410 may provide an order for a pizza through a network to the ordering backend 420.

The mobile application 412 may be an application running on a mobile device that provides a notification inviting a customer to place an order, and enables a customer to accept the invitation and place the order. For example, an application running on a customer's smart phone may invite a customer to place an order for a pizza, and may also enable the customer to place an order for pizza. A mobile device may include a smart phone, a tablet computer, or some other type of computing device that may be portably used. The mobile application 412 may provide an interface for a customer to accept or place an order. For example, the mobile application 412 may display on the mobile device an interface for the customer to order a pizza. The mobile application 412 may provide orders to an ordering backend 420. For example, the mobile application 412 may provide an order for a pizza through a network to the ordering backend 420.

The web application 414 may be an application accessible through a web browser running on a computing device, where the application enables a customer to place an order. For example, a Java application may be rendered by a web browser on a desktop computer and enable a customer to place an order for pizza. A computing device may include a mobile device, a desktop computer, a laptop computer, or some other type of device that computes. The web application 414 may provide an interface for a customer to place an order. For example, the web application 414 may display an interface, in a web browser on a desktop computer, for the customer to order a pizza. The web application 414 may provide orders to an ordering backend 420. For example, the web application 414 may provide an order for a pizza through a network to the ordering backend 420.

The text or SMS application 416 may be an application running on a mobile device that enables a customer to place an order by text or SMS. For example, an application running on a customer's smart phone may enable the customer to send a text or SMS message to the ordering backend 420 to place an order for pizza. In some implementations, the application may provide a graphical user interface for the user to select a particular item, particular location, and a particular time to receive the item, and generate a SMS message indicating the selections and provide the SMS message to the ordering backend 420.

The voice interface 418 may be an interface that enables a customer to place an order by voice. For example, the voice interface 418 may be a telephone that a customer may use to verbally order a pizza. The voice interface 418 may communicate with the call center workstations 422. For example, the voice interface 418 may transmit audio captured by the voice interface 418 to the call center workstations 422, and similarly, output audio from the call center workstations 422. The voice interface 418 may additionally or alternatively communicate with a local voice-based order taking component 432 of a local fulfillment center workstation 430. For example, the voice interface 418 may transmit audio captured by the voice interface 418 to the local voice-based order taking component 432, and similarly, output received audio from the local voice-based order taking component 432.

The call center workstations 422 may receive voice input from the voice interface 418, generate orders based on the voice input, and provide the orders to the ordering backend 420. For example, the call center workstations 422 may audibly output voice input from the interface 418 to allow customer service representatives to verbally interact with customers, and generate orders for the customers. In some implementations, the call center workstations 422 may be automated and use speech recognition to generate orders for users. For example, the call center workstations 422 may execute an Artificial Intelligence customer service agent program that may verbally speak to the customer to take the order and place the order directly for the customer.

The ordering backend 420 may be a component that processes orders from customers. For example, the ordering backend may receive orders from the smart appliances 410, mobile application 412, web application 414, text or SMS application 416, the voice interface 418, or the call center workstations 422. The ordering backend 420 may process orders based on determining, for each order, one or more local fulfillment center workstations 430 to receive the order. For example, the ordering backend 420 may determine that a first order for a pizza should be provided to a first local fulfillment center workstation and a second order for a pizza should be provided to a different, second local fulfillment center workstation.

The ordering backend 420 may determine a local fulfillment center workstation to receive a particular order based on a location which the customer would like to obtain the item ordered. For example, the ordering backend 420 may determine that a first order indicates the order is to be obtained at a location where the distance from the location to the local fulfillment center is within a distance threshold, and in response, determine to provide the first order to a workstation of the local fulfillment center. In another example, the ordering backend 420 may determine that a second order is to be obtained at a location where the distance from the location to the local fulfillment center exceeds a distance threshold, and in response, determine the second order should be provided to a workstation of another local fulfillment center.

Additionally or alternatively, the ordering backend 420 may determine a local fulfillment center workstation to receive a particular order based on availability of the local fulfillment center to fulfill the order. For example, the ordering backend 420 may determine that a first order for a pizza can be fulfilled by a local fulfillment center as the local fulfillment center may still have capacity to provide the pizza.

In another example, the ordering backend 420 may determine that a second order for a pizza cannot be fulfilled by a local fulfillment center as the local fulfillment center may not have capacity to provide the pizza.

In response to determining the local fulfillment center workstations 430 to receive an order, the ordering backend 420 may provide the order to the local fulfillment center workstations 430. For example, in response to determining that a local fulfillment center does deliver to the particular location requested by a customer and has capacity to fulfill an order for pizza, the ordering backend 420 may determine to provide the order for pizza to the local fulfillment center workstations 430 of the local fulfillment center.

In processing the orders, the ordering backend may also process payments for the orders. For example, the ordering backend 420 may validate whether payment information provided in the order is correct. In another example, the ordering backend 420 may place charges for orders using payment information provided in the order.

The ordering backend 420 may include a bulk order processor 424. The bulk order processor 424 may enable the ordering backend 420 to perform mass processing of orders. For example, the ordering backend 420 may receive an extremely large number of orders within a given time frame from the smart appliances 410, mobile application 412, web application 414, text or SMS application 416, the voice interface 418, or the call center workstations 422. Processing such an amount of orders may include determining, for each order, one or more local fulfillment center workstations out of thousands of potential local fulfillment center workstations 430 to receive the order.

The ordering backend 420 may also include a bulk order router 426. The bulk order router 426 may enable the ordering backend 420 to perform mass management of logistics, including delivery scheduling and collection scheduling of received orders. For example, the ordering backend may receive an extremely large number of orders within a given time frame from the smart appliances 410, mobile application 412, web application 414, text or SMS application 416, the voice interface 418, or the call center workstations 422. Managing the delivery scheduling or collection scheduling of such an amount of orders may include determining an order preparation schedule for each local fulfillment center workstation.

The ordering backend 420 performs a variety of tasks relating to processing or routing bulk orders, including sorting, assigning, routing, queuing, distributing and scheduling, to name a few. The study, optimization and execution of these tasks requires the uses of techniques and results from well-developed, active areas of scientific research, such as operational research, combinatorial optimization, graph theory (in particular network theory), queuing theory, and transport theory. Executing or providing optimal solutions to such tasks are proven to be complex and mathematically hard, particularly when considering large-scale systems. For example, e-commerce giant Amazon reported that they received, processed and delivered orders for 426 items per second in the run up to Christmas in 2013, see for example http://articles.latimes.com/2013/dec/26/business/la-fi-tn-amazon-sold-426-items-per-second-cyber-monday-20131226.

Since scaling is an extremely important factor, particularly in the context of e-commerce, tasks relating to processing or routing bulk orders quickly become extremely difficult, if not impossible, to solve and require powerful computers implementing complex algorithms and elegant mathematical programming techniques, as well as robust hardware architectures that can be parallelized. In some cases, it has even been shown that many tasks relating to the processing or routing of bulk orders are computationally intractable. In fact, the theory of computational complexity has introduced a concept of NP-hardness to classify such computationally intractable tasks.

For example, consider the intensely studied Traveling Salesman Problem (TSP), an NP-hard problem in combinatorial optimization. In its purest formulation, the TSP may be described as follows: given a list of cities and the distances between each pair of cities, what is the shortest route that visits each city exactly once, and returns to the original city. The TSP may also be modeled and described as a graph problem, wherein the cities are the graph's vertices and the distances between each pair of cities are the lengths of the graph's edges, or formulated as an integer linear program. The TSP has several applications in operational research, including planning and logistics, wherein the concept of a city may represent customers or orders, and the concept of a distance may represent travelling times or incurred costs. In some implementations, additional constraints may be imposed on the TSP, such as limiting an amount of resources or limiting to certain time windows. Finding increasingly efficient solutions to the TSP and other such complex, subtle operational research problems is an active area of scientific research, as evidenced by a plethora of technical textbooks, journals and scientific articles. See, for example "In Pursuit of the Travelling Salesman: Mathematics at the Limits of Computation," William Cook, Princeton University Press, 2011, "Dynamic programming strategies and reduction techniques for the traveling salesman problem with time windows and precedence constraints," L. Bianco, A. Mingozzi, and S. Ricciardelli, *Operations Research*, 45 (1997) 365-377 and "Scheduling vehicles from a central depot to a number of delivery points," G. Clarke and J. Wright, *Operations Research* 12 (1964) 568-581.

Another well-studied, fundamental combinatorial optimization problem in the field of operational research and optimization is the Assignment Problem (AP). In its most general form, the AP may be described as follows: given a number of agents, a number of tasks and a set of incurring costs for each potential agent-task assignment, perform all tasks by assigning one agent to each task, and one task to each agent, such that the total costs incurred is minimized. The AP also has several applications in areas such as planning and logistics. For example, the ordering backend 420 may interpret the task of processing received orders as an assignment problem, wherein a local fulfillment center workstation can be assigned to deliver an order, incurring some cost. The bulk order processor 424, for example, may require that all orders are delivered by assigning one local fulfillment center to each order, and one order to each local fulfillment center, in such a way that the total cost of the assignment is minimized. It has been shown that such an assignment problem can be expressed mathematically as a standard linear program, see, for example "Algorithms for the Assignment and Transportation Problems," James Munkres, *Journal of the Society for Industrial and Applied Mathematics Vol. 5, No.* 1 (March, 1957), pp. 32-38.

Linear programming has been shown to be an extremely powerful, essential optimization technique widely applied in various fields of study such as business studies and economics, as well as industrial areas such as engineering, transportation and manufacturing. The sophisticated mathematical programming techniques used in linear programming have proven essential to the modeling of diverse types of problems in routing, scheduling and assignment, and in turn have led to the creation of powerful computer systems that enable businesses to reduce costs, improve profitability, use resources effectively, reduce risks and provide untold benefits in many other key dimensions. Mathematically, linear programming is a technique for the optimization of a linear objective function, subject to linear equality and linear inequality constraints. While this requirement may seem overly restrictive, many real-world business problems can be formulated in this manner. Today, commercial linear-programming codes are able to solve linear programs with millions of constraints. For example, the commercial, high-performance mathematical programming solver IBM ILOG CPLEX of IBM is able to solve linear programs with the number of megabytes required for computation approximately equal to the number of constraints divided by 1000, see http://www-01.ibm.com/support/docview.wss?uid=swg21399933.

When dealing with large-scale systems, system components, such as the ordering backend 120, may employ techniques and results from Queuing Theory—the mathematical study of waiting lines, or queues—in order to model incoming customers or orders and subsequently make business decisions relating to order fulfillment, resource requirements for providing a certain service, expected waiting time in a queue, average time in a queue, expected queue length, expected number of customers in a queue at a given time, and the probability of a system to be in a certain state, such as empty or full. For example, it has been shown that most queues in restaurant operations can be described by an M/M/1 queue, where arrivals are determined by a Poisson process with heavy periods around lunch and dinner time, and service times have an exponential distribution. In a complex system of multiple M/M/1 queues, or a queue network, deep and sophisticated mathematical techniques such as stochastic calculus may be employed to model or approximate the queuing process. For example, in some implementations a heavy traffic approximation may be used to approximate a queuing process by a reflected Brownian motion, Ornstein-Uhlenbeck process or more general diffusion process. Since queues are basic components to both external and internal business processes, including scheduling and inventory management, understanding the nature of queues and learning how to manage them is one of the most important areas in operational research and management. See, for example, "A Methodology and Implementation for Analytic Modeling in Electronic Commerce Applications," H. Edwards, M. Bauer, H. Lutfiyya, Y. Chan, M. Shields and P. Woo, *Electronic Commerce Technologies, Lecture notes in computer science, Volume 2040*, 2001, pp 148-157 and "Stochastic Models in Queuing Theory", J. Medhi, Elsevier Academic Press, 2002.

The local fulfillment center workstations 430 may receive orders from the ordering backend 420. For example, a particular local fulfillment center workstation may receive an order for pizza from the ordering backend 420. The local fulfillment center workstations may be located on the premises of the local fulfillment center and used by agents of the local fulfillment center. For example, a local fulfillment center workstation of a pizza provider may be located in a kitchen of the pizza provider and used by bakers to determine what pizzas to bake and when to bake the pizzas. In another example, local fulfillment center workstations of a pizza provider may be located in delivery vehicles of the pizza provider and used by pizza deliverers to determine where to deliver each pizza or a delivery route for the pizzas. The delivery route may be dynamically planned based on types of orders and locations to which the orders will be delivered. In yet another example, a local fulfillment center workstation may be used by a cashier of a pizza provider and used by the cashier to place additional orders for customers within the restaurant or determine whether a customer is the correct customer to receive a pizza that is ordered for pickup at the restaurant.

The local fulfillment center workstations 430 may provide information to agents of the local fulfillment center to fulfill orders. For example, a particular local fulfillment center workstation of a pizza provider may display an order number, a type of pizza ordered, a customer name for the order, a place of delivery for the order, and a time of delivery for the order. The local fulfillment center workstations 430 may obtain the information to provide agents of the local fulfillment center from the orders received from the ordering backend 420. For example, the orders received from the ordering backend 420 may include data that indicates an order number, a type of pizza ordered, a customer name for the order, a place of delivery for the order, and a time of delivery for the order. In some implementations, the local fulfillment center workstations 430 may prioritize the fulfillment of orders. For example, the local fulfillment center workstations 430 may prioritize the fulfillment of orders based on when the orders are to be provided to the users.

The local fulfillment center workstations 430 may include a local, voice-based order taking component 432. For example, the local fulfillment center workstations 430 may include a telephone-based system with which an employee of the local fulfillment center may speak to the customer. The local, voice-based order taking component 432 may enable customers to place orders directly with the local fulfillment center. For example, the same local fulfillment center workstations 430 that receive orders from the ordering backend 420 may also be used to generate orders based on input from customer service agents using the local fulfillment center workstations 430. In some implementations, the local, voice-based order taking component 432 may be automated and use speech recognition to generate orders for users.

The local fulfillment center workstations 430 may additionally or alternatively communicate with a supply chain or finance or enterprise component of a third party. For example, a local fulfillment center workstation may place an order for more flour with a supply chain component of a third party that sells flour for pizza. In another example, a local fulfillment center workstation may communicate with a finance component to place payment charges for orders.

Figure 5:
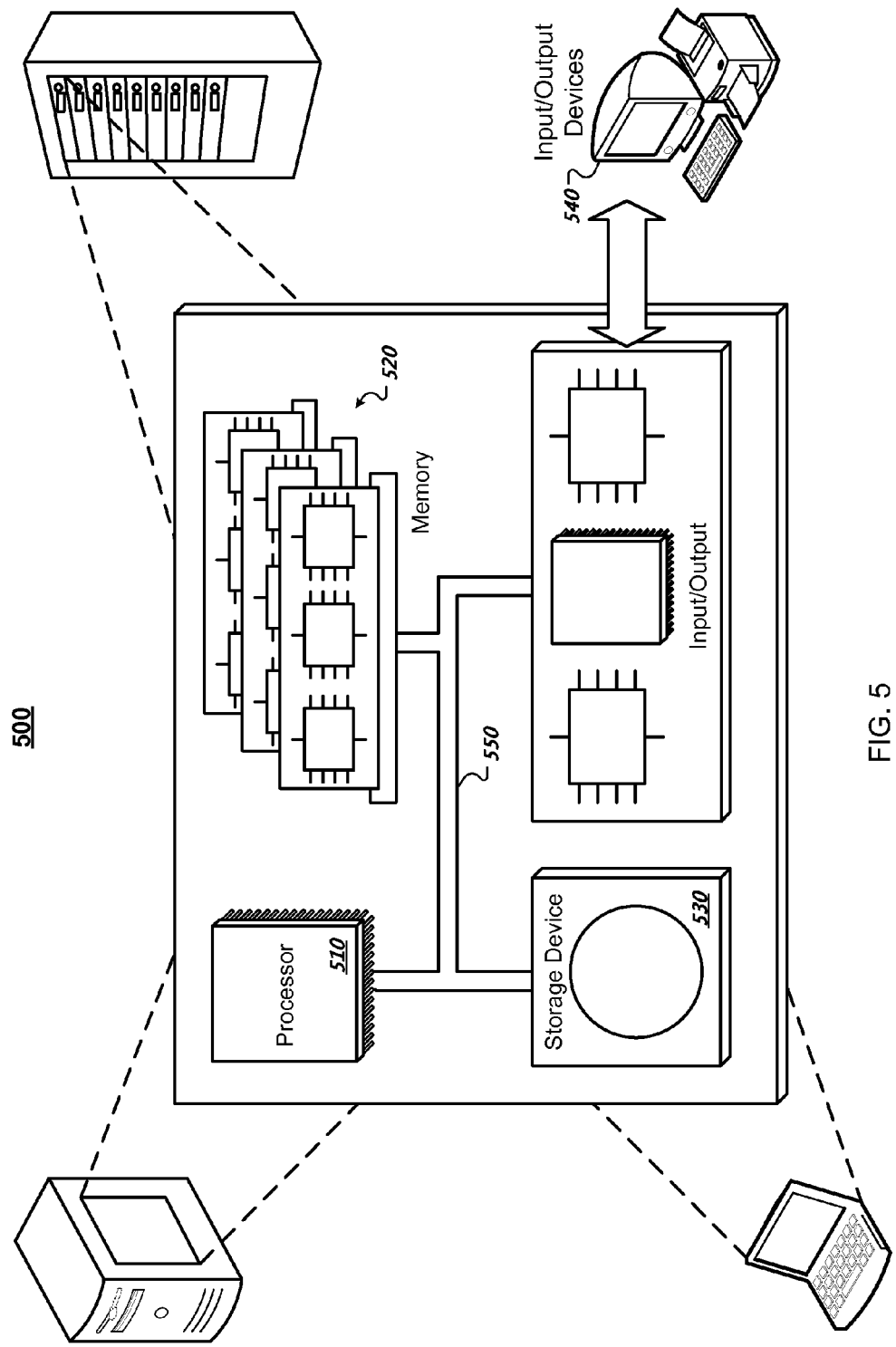
FIG. 5 depicts an example computing device.

FIG. 5 illustrates a schematic diagram of an exemplary generic computer system. The system 500 can be used for the operations described in association with the process 300 according to some implementations.

The system 500 includes a processor 510, a memory 520, a storage device 530, and an input/output device 540. Each of the components 510, 520, 530, and 520 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   receiving a particular set of user data, the particular set of user data including user data obtained from a user device;
   obtaining a predictive model that comprises (i) a first sub-predictive model that estimates a likelihood that a user has already ordered, but has not yet consumed, food, and (ii) a second sub-predictive model that received, as an input, the likelihood that the user has already ordered, but has not yet consumed, food, and that estimates a likelihood of the user to order a food item, wherein the predictive model is generated using observation data that includes historic user data and user data from other user devices;
   providing the particular set of user data to the predictive model;
   obtaining, from the predictive model, an indication of the likelihood of the user to order the food item;
   based on the indication of the likelihood of the user to order the food item obtained from the predictive model, determining whether to output a notification on the user device inviting the user to order the food item; and
   in response to determining whether to output the notification on the user device inviting the user to order the food item, selectively outputting the notification on the user device inviting the user to order the food item.

2. The method of claim 1, wherein the first sub-predictive model is generated using observation data that includes a user's purchase history, browser history, search query history, calendar history and location history.

3. The method of claim 1, wherein the predictive model further comprises a third sub-predictive model that estimates an inclination of the user to cook.

4. The method of claim 1, wherein the predictive model further comprises a third sub-predictive model that estimates an inclination of the user to dine out.

5. The method of claim 1, wherein the predictive model further comprises a third sub-predictive model that estimates a likelihood that the user has already ordered food within a recent time interval.

6. The method of claim 1, wherein the predictive model further comprises a third sub-predictive model that estimates a likelihood that the user has performed an activity other than eating or visiting a restaurant that is associated with ordering food.

7. The method of claim 1, wherein the predictive model further comprises a third sub-predictive model that estimates a likelihood that the user has performed an activity that is associated with not wanting to order food.

8. The method of claim 1, wherein the second sub-predictive model comprises a final predictive model component and the second sub-predictive model receives one or more outputs from the first sub-predictive model.

9. The method of claim 8, wherein the second sub-predictive model estimates a likelihood of the user to order a food item, wherein the predictive model is generated using observation data that includes historic user data.

10. The method of claim 1, wherein the particular set of user data includes location information, time and date information, calendar entries information, weather information and mode of transport information.

11. The method of claim 1, wherein the predictive model comprises a decision tree.

12. The method of claim 1, wherein the indication of how likely a user of the user device wants to order the food item includes a confidence score.

13. The method of claim 12, wherein determining whether to output a notification on the user device inviting the user to order the food item comprises:
   generating a confidence score threshold;
   determining whether the confidence score exceeds or meets the confidence score threshold.

14. The method of claim 1, wherein selectively outputting a notification on the user device inviting the user to order the food item comprises:
   generating one or more food item recommendations;
   selecting a food item recommendation from the one or more food item recommendations;
   generating a notification inviting the user to order the food item;
   providing the generated notification inviting the user to order the food item for display on the user device.

15. The method of claim 1, further comprising:
   receiving an acceptance of the invitation to order the food item;

processing the order for the food item.

16. A system comprising:
one or more computers; and
a computer-readable medium coupled to the one or more computers having instructions stored thereon which, when executed by the one or more computers, cause the one or more computers to perform operations comprising:
    receiving a particular set of user data, the particular set of user data including user data obtained from a user device;
    obtaining a predictive model that comprises (i) a first sub-predictive model that estimates a likelihood that a user has already ordered, but has not yet consumed, food, and (ii) a second sub-predictive model that received, as an input, the likelihood that the user has already ordered, but has not yet consumed, food, and that estimates a likelihood of the user to order a food item, wherein the predictive model is generated using observation data that includes historic user data and user data from other user devices;
    providing the particular set of user data to the predictive model;
    obtaining, from the predictive model, an indication of the likelihood of the user to order the food item;
    based on the indication of the likelihood of the user to order the food item obtained from the predictive model, determining whether to output a notification on the user device inviting the user to order the food item; and
    in response to determining whether to output the notification on the user device inviting the user to order the food item, selectively outputting the notification on the user device inviting the user to order the food item.

17. The system of claim 16, wherein the first sub-predictive model is generated using observation data that includes a user's purchase history, browser history, search query history, calendar history and location history.

18. The system of claim 16, wherein the predictive model further comprises a third sub-predictive model that estimates an inclination of the user to cook.

19. The system of claim 16, wherein the predictive model further comprises a third sub-predictive model that estimates a likelihood that the user has performed an activity other than eating or visiting a restaurant that is associated with ordering food.

20. The system of claim 16, wherein the predictive model further comprises a third sub-predictive model that estimates a likelihood that the user has performed an activity that is associated with not wanting to ordering food.

21. A computer storage medium encoded with a computer program, the program comprising instructions that when executed by data processing apparatus cause the data processing apparatus to perform operations comprising:
    receiving a particular set of user data, the particular set of user data including user data obtained from a user device;
    obtaining a predictive model that comprises (i) a first sub-predictive model that estimates a likelihood that a user has already ordered, but has not yet consumed, food, and (ii) a second sub-predictive model that received, as an input, the likelihood that the user has already ordered, but has not yet consumed, food, and that estimates a likelihood of the user to order a food item, wherein the predictive model is generated using observation data that includes historic user data and user data from other user devices;
    providing the particular set of user data to the predictive model;
    obtaining, from the predictive model, an indication of the likelihood of the user to order the food item;
    based on the indication of the likelihood of the user to order the food item obtained from the predictive model, determining whether to output a notification on the user device inviting the user to order the food item; and
    in response to determining whether to output the notification on the user device inviting the user to order the food item, selectively outputting the notification on the user device inviting the user to order the food item.

\* \* \* \* \*